United States Patent
Ohsaki et al.

[11] Patent Number: 5,868,616
[45] Date of Patent: Feb. 9, 1999

[54] AIR CONDITIONING SYSTEM FOR AN AUTOMOBILE

[75] Inventors: Katsuyuki Ohsaki, Chiryu; Hisashi Ueda, Kariya, both of Japan

[73] Assignee: Nippondenso Co., Ltd., Japan

[21] Appl. No.: 623,767

[22] Filed: Mar. 29, 1996

[30] Foreign Application Priority Data

Mar. 31, 1995 [JP] Japan .................................... 7-075336
Oct. 6, 1995 [JP] Japan .................................... 7-260037

[51] Int. Cl.⁶ ....................................................... B60H 3/06
[52] U.S. Cl. ............................................. 454/158; 454/75
[58] Field of Search ............................. 454/75, 134, 158

[56] References Cited

U.S. PATENT DOCUMENTS

| | | | |
|---|---|---|---|
| 5,076,821 | 12/1991 | Bruhnke et al. | 454/158 X |
| 5,256,103 | 10/1993 | Abthoff et al. | 454/139 |
| 5,320,577 | 6/1994 | Tooru et al. | 454/139 X |
| 5,683,495 | 11/1997 | Derx | 454/158 X |

FOREIGN PATENT DOCUMENTS

| | | |
|---|---|---|
| 57-172817 | 11/1982 | Japan . |
| 59-32516 | 2/1984 | Japan ..................................... 454/158 |
| 1-160723 | 6/1989 | Japan ..................................... 454/158 |
| 4-271916 | 9/1992 | Japan ..................................... 454/158 |
| 5-2718 | 1/1993 | Japan . |

Primary Examiner—Harold Joyce
Attorney, Agent, or Firm—Pillsbury Madison & Sutro, LLP

[57] ABSTRACT

An automobile air conditioning system including a fan unit for generating an air flow. The air flow is directed to the passenger compartment of the automobile through a first air duct which is provided downstream of the fan unit. A second air duct branches from the first air duct which extends over and in parallel to the first air duct. A filter is provided between the first and second air ducts for cleaning the air flow to the second air duct from the first air duct through the filter. Further, the air conditioning system is provided with means for selectively directing the air flow from the fan unit to the passenger compartment through the first air duct or through the first and second air ducts.

17 Claims, 16 Drawing Sheets

Fig.19

| θ | 5° | 10° | 20° | 30° | 40° | 50° | 60° | --- | 90° |
|---|---|---|---|---|---|---|---|---|---|
| ξ | 0.17 | 0.28 | 0.45 | 0.59 | 0.73 | 0.90 | 1.0 | --- | 1.0 |

AIR CONDITIONING SYSTEM FOR AN AUTOMOBILE

BACKGROUND OF THE INVENTION (1) Field of the Invention

The invention relates to a duct arrangement for a filter, which is used in an automobile air conditioning system, for removing smells from the air.

(2) Description of the Related Art

Japanese Unexamined Patent Publication (Kokai) No. 57-172817 describes an automobile air conditioning system which comprises a deodorization filter for removing odors and dust from the air within the passenger compartment. The deodorization filter comprises an energized charcoal for removing odorous substances such as Nox and CH, which are contained in exhaust gas from automobiles and are introduced into the passenger compartment. In addition to the malodor, such substances are bad for the health of passengers within the passenger compartment. The deodorization filter is provided downstream of an evaporator within an air duct. A damper assembly is arranged within the air duct to switch the air between normal mode, in which the air from the evaporator directly distributed into the passenger compartment without passing through the deodorization filter, and deodorization mode, in which the air from the evaporator passes through the deodorization filter for removing the odorous substances. When the deodorization mode is selected, the air, which has passed through the evaporator, is directed to the deodorization filter.

In the air system of JPP '817, the deodorization filter in the air duct hinders the air flow to increase the flow resistance during the normal mode, which results in decrease in the flow rate, increase in noise of the air flow, and increase in power consumption of the fan motor.

Japanese Unexamined Patent Publications (Kokai) No. 4-271916 and No. 5-2718 describe an automobile air conditioning system which comprises main and by-pass air ducts and a deodorization filter, which is provided in the by-pass air duct, for removing odors and dust from the air within the passenger compartment. Provided within the main air duct is a valve or a door for switching the air flow between the main and by-pass air ducts. The deodorization filter is provided within the by-pass air duct to be oriented substantially perpendicular to the direction air flow in the main air duct. Thus, the deodorization filter and the by-pass air duct which encloses the deodorization filter extend outwardly from the main air duct into the passenger compartment of the automobile.

The invention is directed to solve the prior art problems described above, and to provide an air conditioning system improved to minimize the space required for installation as well as the flow resistance during the normal mode.

SUMMARY OF THE INVENTION

According to the invention, an automobile air conditioning system is provided. The air conditioning system includes a fan unit for generating an air flow. The air flow is directed to the passenger compartment of the automobile through a first air duct which is provided downstream of the fan unit. A second air duct branches from the first air duct which extends over and in parallel to the first air duct. A filter means is provided between the first and second air ducts for cleaning the air flow to the second air duct from the first air duct through the filter means. Further, the air conditioning system is provided with means for selectively directing the air flow from the fan unit to the passenger compartment through the first air duct or through the first and second air ducts.

The air conditioning system can reduce the space required for installation in the automobile since the second air duct branches from the first air duct and extends over and in parallel to the first air duct.

In another feature of the invention, the filter means comprises a deodorization filter which removes odorous substances in the air flow through the deodorization filter. Preferably, the deodorization filter is formed into a flat plate which extends substantially in a horizontal plane between the first and second air ducts. The horizontal placement of the deodorization filter between the first and second air ducts reduces the space required for installation of the air conditioning system.

According to another feature of the invention, the air conditioning system includes means for directing the air flow from the fan unit to the passenger compartment through the first air duct or the first and second air duct. A normal mode of air conditioning is selected when the air flow is directed to the passenger compartment of the automobile through the first air duct. On the other hand, a deodorization mode of air conditioning is selected when the air flow is directed to the passenger compartment through the first and second air ducts.

According to another feature of the invention, the fan unit includes a centrifugal fan, and a scroll casing which contains the centrifugal fan. The first air duct includes a bottom wall which faces the filter means. The bottom wall is formed substantially into a trapezoidal shape. The first air duct further includes a pair of side walls connected to the bottom wall along the oblique sides of the bottom wall. The oblique sides of the bottom wall symmetrically diverge in the downstream direction within the first air duct. The scroll casing includes an outer wall which extends spirally. The end of the outer wall is connected to the bottom wall at the top side of the trapezoid. The diverged bottom wall and the side walls of the first air duct minimize the pressure loss due the sudden expansion of the first air duct.

BRIEF DESCRIPTION OF THE DRAWINGS

These and other objects and advantages and further description will now be discussed in connection with the drawings in which:

FIG. 19 is a table which shows the relation between the angle of the bottom wall of the first air duct and a coefficient concerning the flow resistance within the first air duct.

DESCRIPTION OF THE PREFERRED EMBODIMENTS

With reference to FIGS. 1–8, the first embodiment of the invention will be described.

Figure 1:
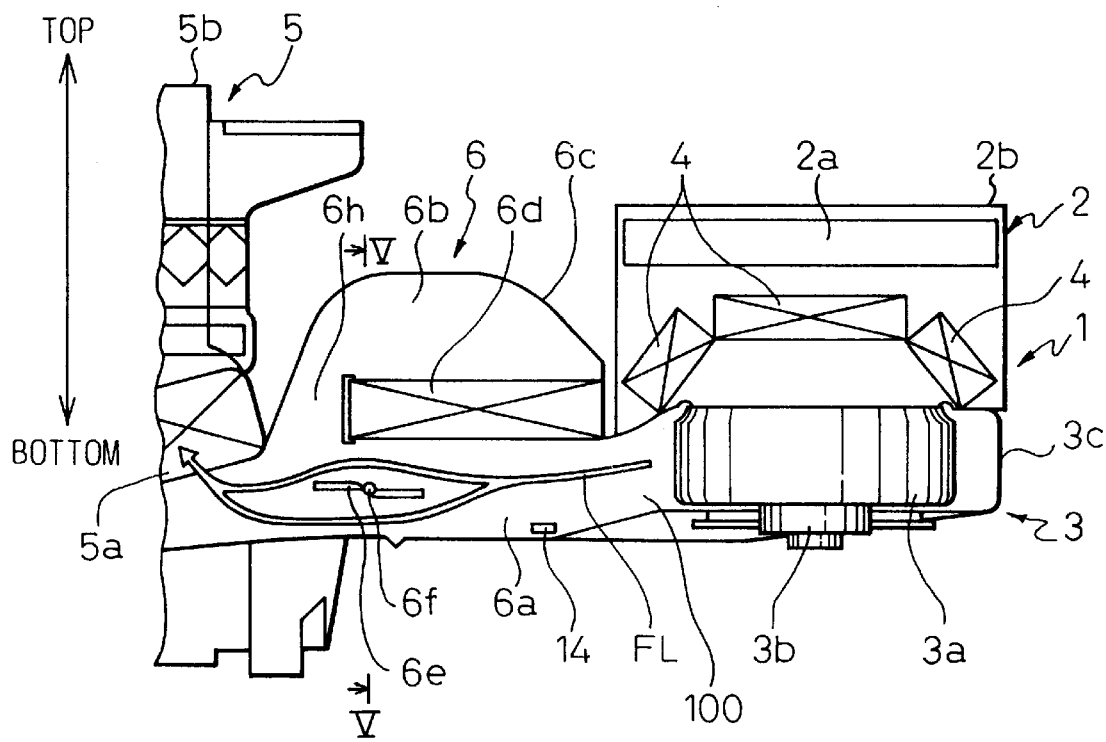
FIG. 1 is a sectional view of an air conditioning system according to the invention, in which a normal mode of air conditioning is selected.

FIG. 1 illustrates a partial section of an air conditioning system according to the first embodiment of the invention. The air conditioning system comprises a fan unit 1, an air conditioning unit 5, and a deodorization filter unit 6 between the fan unit 1 and the air conditioning unit 5.

Figure 5:
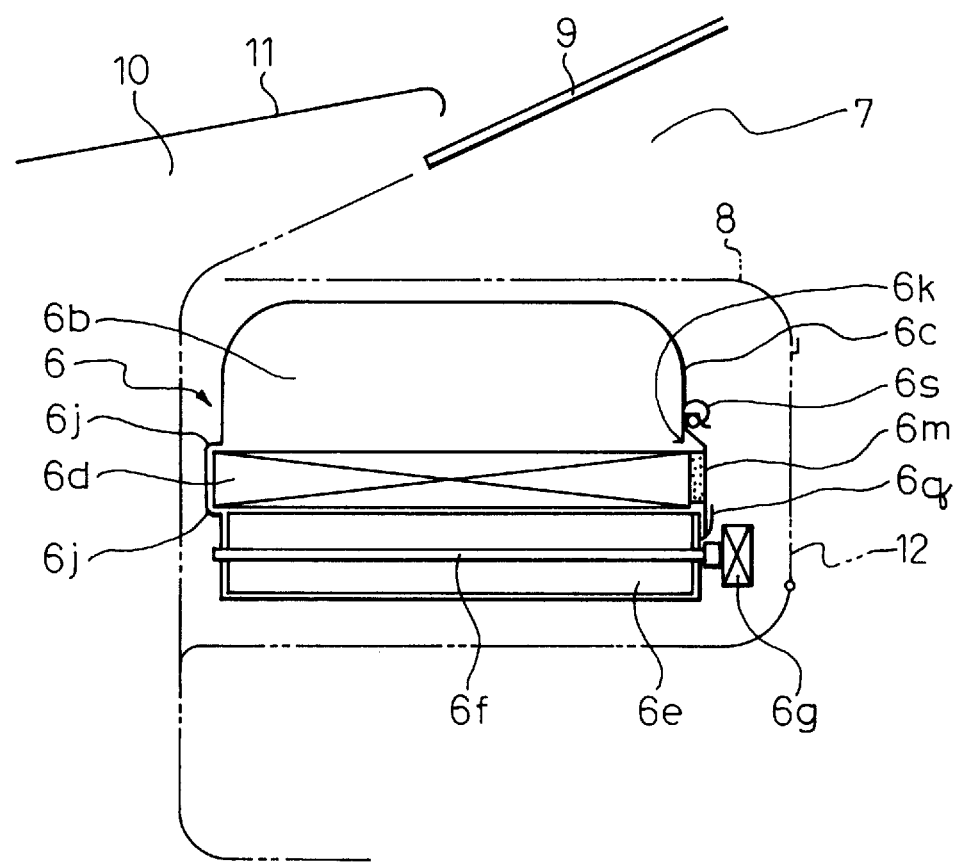
FIG. 5 is a sectional view of a car dashboard within which the air conditioning system of FIG. 1 is provided.

With reference to FIG. 5, the air conditioning system is mounted under a car dashboard 8 and, in particular, within a glove box. FIG. 5 is a schematic sectional illustration of the air conditioning system along line V—V in FIG. 1 with an automobile constitution around the system. In FIG. 5, 7 denotes a passenger compartment; 9 denotes a front window glass; 10 denotes an engine compartment; 11 denotes an engine compartment hood; and 12 denotes a front door of the glove box. In this embodiment, the air conditioning system is adapted to be mounted under the car dashboard 8 in front of the front passenger seat, that is, under the right side portion of the car dashboard 8 (in this embodiment, the air conditioning system is used in an automobile with the steering wheel on left side).

The fan unit 1 comprises a fan 3 which is disposed within a enclosure of the fan unit 1 so that its rotational axis is substantially vertical. The fan 3 comprises a centrifugal fan 3a, drive motor 3b for the centrifugal fan 3a, and a scroll casing for supporting the fan motor 3b and for enclosing the centrifugal fan 3a. The scroll casing 3b is formed to draw air from a top opening (not shown) in the top wall of the scroll casing 3c, and to direct an air flow generated by the centrifugal fan 3a to the air conditioning unit 5 through a connecting duct 100 and a deodorization filter unit 6, as described hereinafter.

Figure 2:
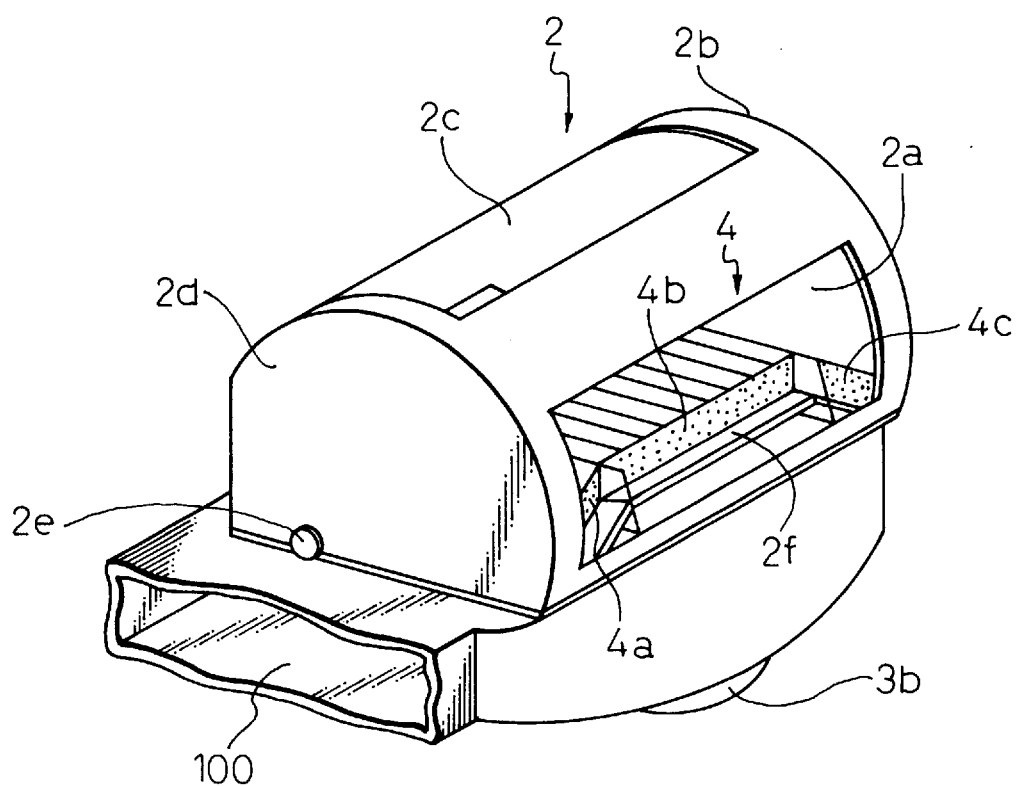
FIG. 2 is a perspective view of a switching box used for the air conditioning system of FIG. 1.

Provided above the fan 3 is a switching box 2 for switching a suction port between an interior port, from which air in the passenger compartment is drawn into the fan 3, and an exterior port, from which air outside of the automobile is drawn into the fan 3. In particular, as shown in FIG. 2, the switching box 2 comprises a housing 2b substantially in the form of a half cylinder. The housing 2b includes a first opening 2a as the interior suction port and a second opening as the exterior port. The first opening 2a is fluidly connected to the passenger compartment, and the second opening 2c is fluidly connected to the outside of the automobile. A door (not shown) is provided for rotation about a pivot 2e between a first position where the door closes the first opening 2a and a second position where the door closes the second opening 2c.

Within the housing 2b of the switching box 2, a dust filter assembly 4 is provided for removing dust contained in the air introduced into the air conditioning system. The dust filter assembly 4 comprises three filter elements 4a, 4b and 4c which close the top opening of the fan 3. The filter elements 4a, 4b and 4c are supported by a support 2f which is formed into a trapezoidal shape as shown in FIG. 2 to increase the filtration surface of the dust filter assembly 4, and to increase the life time of the dust filter elements 4a, 4b and 4c. The dust filter elements 4a, 4b and 4c can be made of, for example, an electret nonwoven fabric.

The air conditioning unit 5 is disposed on the left side of the fan unit 1 with the deodorization filter unit 6 therebetween. The air conditioning unit 5 comprises a casing 5b and a heat exchanging unit which is disposed within the casing 5b. The heat exchanging unit comprises an evaporator 5a and a heater core (not shown) which is disposed downstream of the evaporator 5a.

The evaporator 5a is connected to a refrigerant circuit (not shown) to receive a refrigerant medium, as is well known in the art. The refrigerant medium is expanded through an expansion valve (not shown) provided at the inlet of the evaporator 5a. The expanded refrigerant gas reduces the temperature of the evaporator 5a. Thus, the temperature of the air which passes through the evaporator 5a decreases.

The heater core is a conventional type that is connected to a cooling system of the automobile engine (not shown) to receive the heated cooling water, as is well known in the art. The heated water introduced into the heater core increases the temperature of the heater core. Thus, the temperature of the air which passes through the heater core increases. The heater core comprises means for controlling the temperature of the heated air, for example, a valve for controlling the flow rate of the heated water from the automobile engine, and a discharge mode switching door (not shown) for switching the positions where the air is discharged into the passenger compartment of the automobile.

The deodorization filter unit 6 comprises a housing 6c which defines first and second air ducts 6a and 6b. The second air duct 6b branches from the first air duct 6a and extends over and substantially in parallel to the first air duct 6a. Provided between the first and second air ducts 6a and 6b is a deodorization filter 6d to separate the first and second air ducts 6a and 6b from each other. The bottom surface of the deodorization filter 6d faces the first air duct 6a, and the top surface of the deodorization filter 6a faces the second air duct 6b. In particular, the deodorization filter 6e extends between the inlet of the first air duct 6a and the switching door 6e to provide a passage 6h between the first and second air ducts downstream of the switching door 6e. As in the prior art, the deodorization filter 6d comprises energized charcoal for removing odorous substances, such as Nox and CH, which are contained in exhaust gas from automobiles and are introduced into the passenger compartment. Addition to the odors, such substances are bad for the health of the passengers within the passenger compartment.

Figure 3:
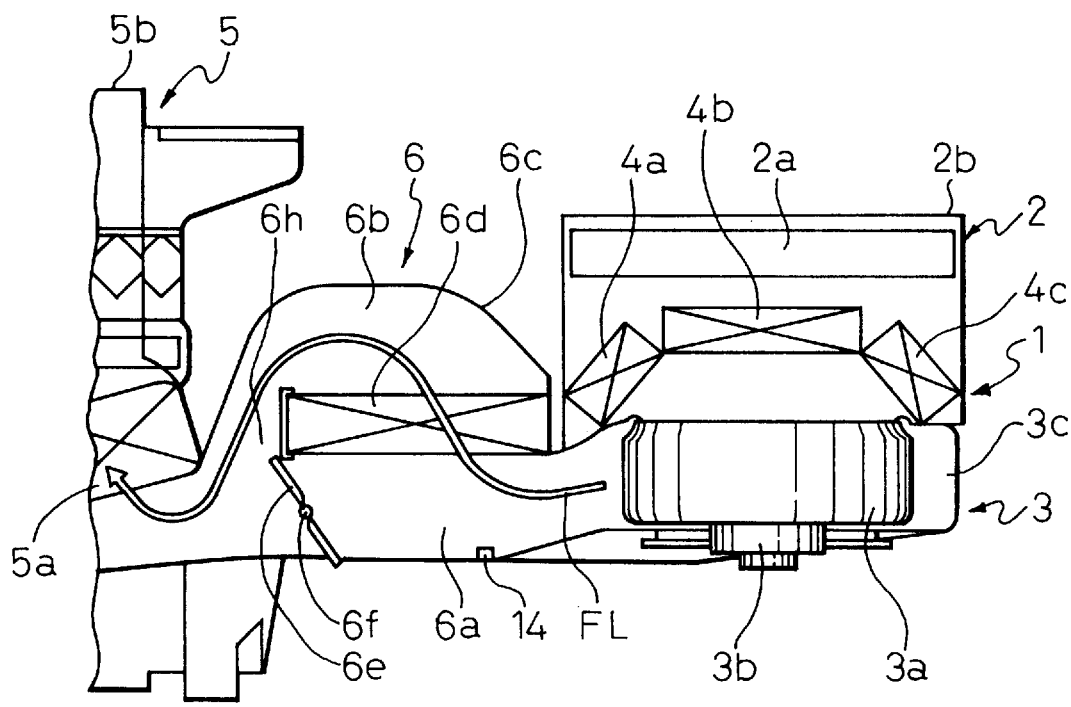
FIG. 3 is a sectional view similar to FIG. 1, in which a deodorization mode is selected.
Figure 4:
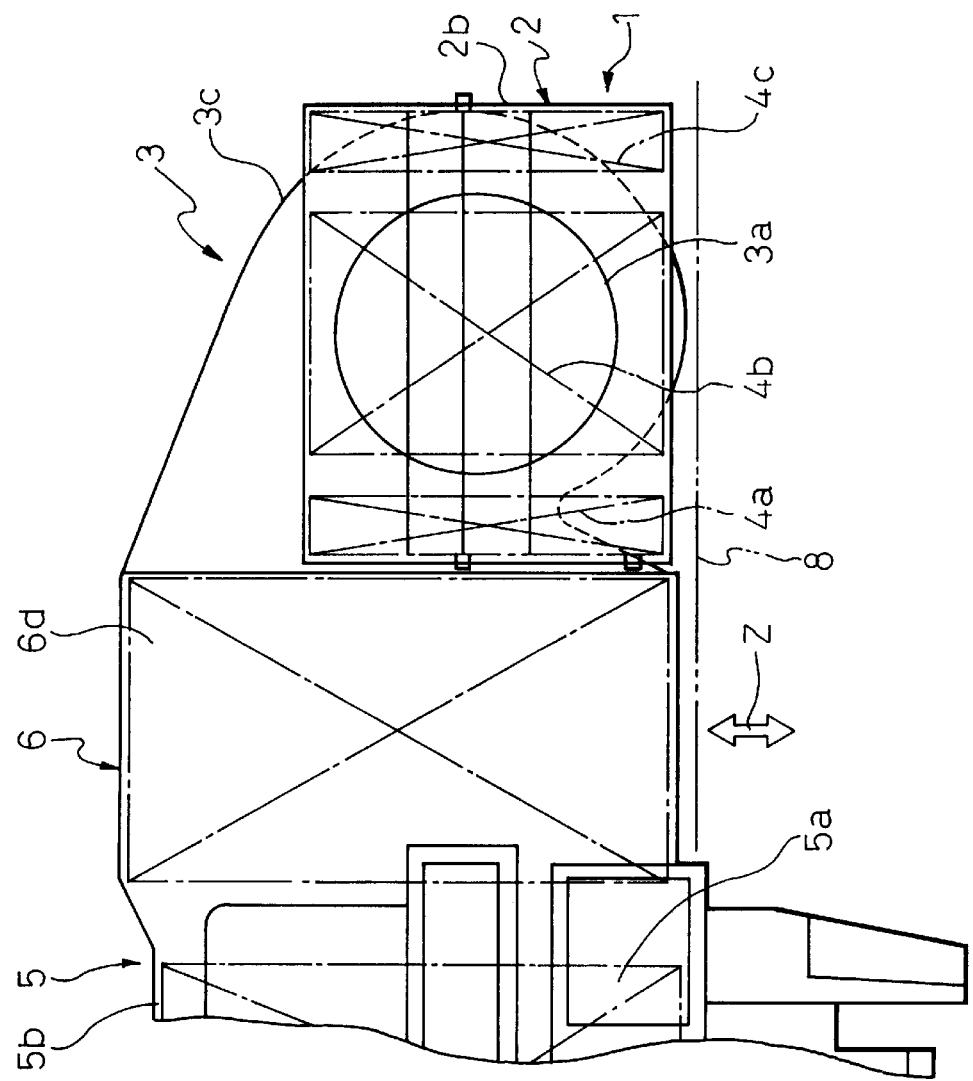
FIG. 4 is plan view of the air conditioning system of FIG. 1.

A switching door or valve 6e is provided within the first air duct 6a substantially under the bottom surface of the deodorization filter 6d, in particular, in this embodiment, at the downstream end of the deodorization filter 6a. The switching door 6e is rotatable about the shaft 6f between a first or normal position, which is shown in FIG. 1, and second or deodorization position which is shown in FIG. 3. A air flow from the fan unit 1 is directed to the air conditioning unit 5 through the first air duct 6a and the switching door 6e as shown by a flow line FL in FIG. 1 when the switching door is at the first position to provide a normal mode of air conditioning. On the other hand, when the switching door 6e is at the second position, the switching door 6e obstructs the air flow through the first air duct 6a to direct it from the fan unit 1 to the air conditioning unit 5 through the deodorization filter 6d, the second air duct 6b and the passage 6h as shown by a flow line FL in FIG. 3. Thus, a deodorization mode of air conditioning is provided.

The shaft 6f is horizontally supported within the first air duct 6a for rotation. The shaft 6f is connected to a drive shaft of a servo-motor 6g (FIG. 5) which is provided outside of the housing 6c. The servo-motor 6g is electrically connected to a control unit as described hereinafter. As described in detail hereinafter, provided within the first air duct upstream of the switching door 6e is a smell sensor which is electrically connected to the controller 15 to control the servo-motor 6g based on concentration of the odorous substances in the air flow within the first air duct 6a.

Figure 6:
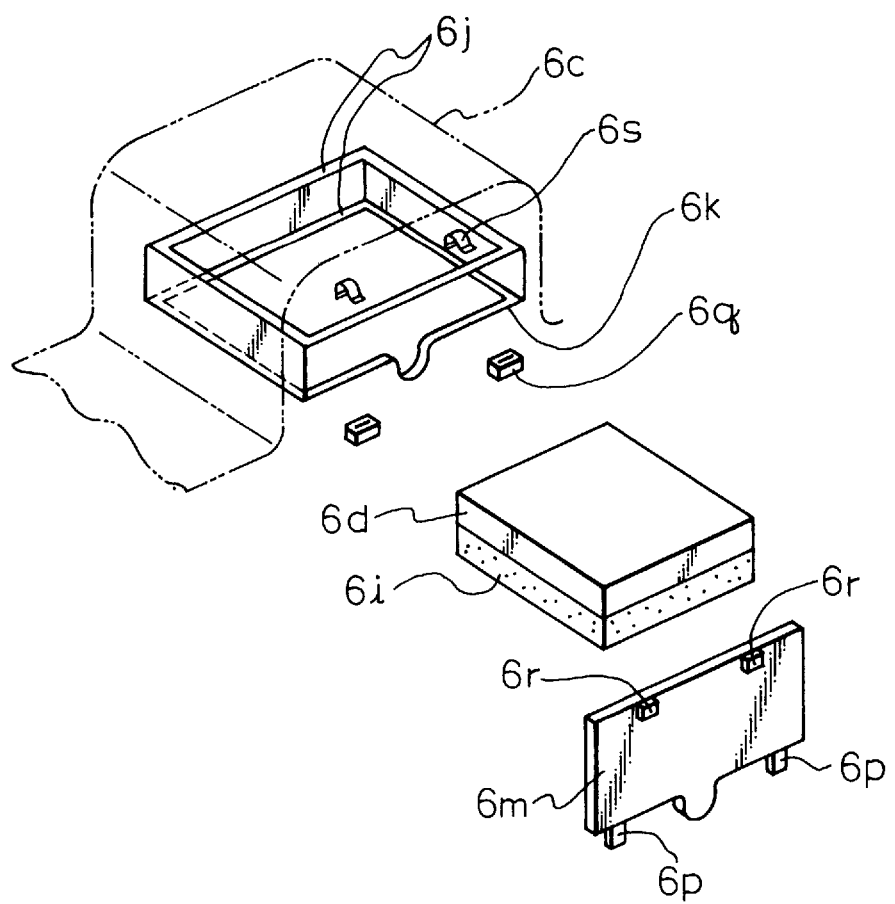
FIG. 6 is fragmental perspective view of a deodorization filter unit of the air conditioning system of FIG. 1.
Figure 7:
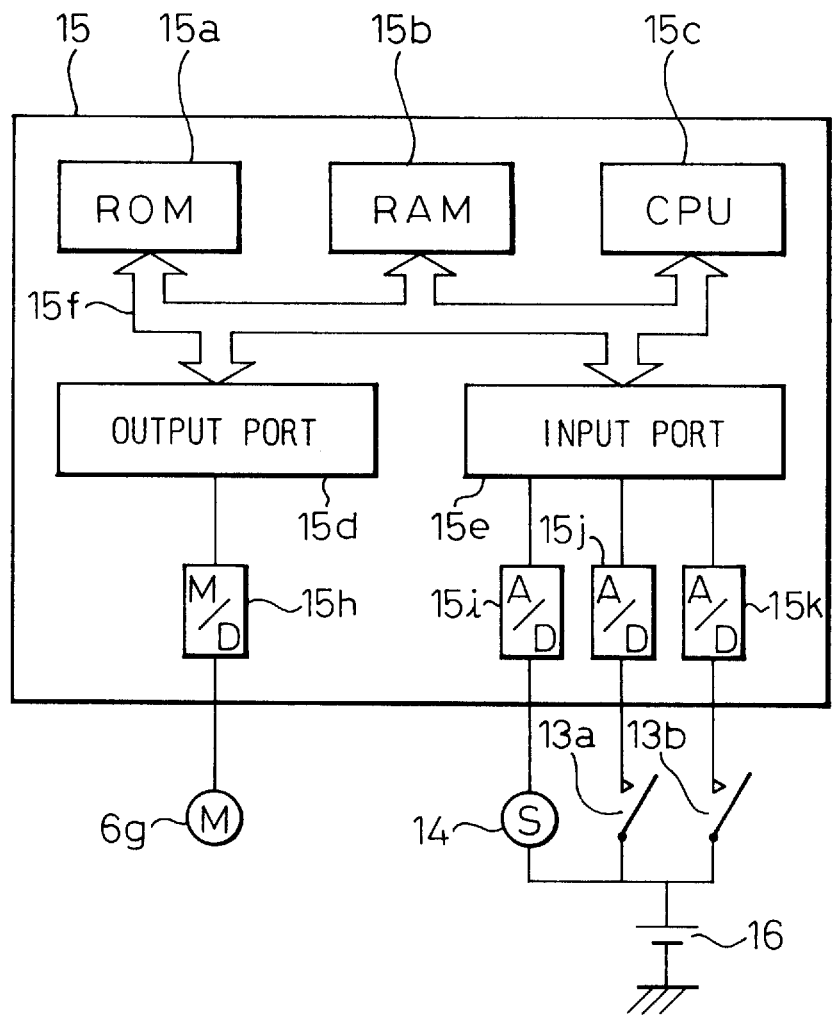
FIG. 7 is a schematic illustration of the controller of the air conditioning system.

With reference to FIG. 6, the deodorization filter 6d is formed into a flat plate with a sealing portion 6i which extends along the periphery on the bottom surface of thereof. The deodorization filter 6d is supported by a frame 6j, which is integrally formed with the housing 6c, to extend in substantially a horizontal plane between the first and second air ducts 6a and 6b. The frame 6j defines top and bottom openings through which air flows when the deodorization mode is selected. The frame 6j further includes a front opening 6k through which the used deodorization filter 6d is removed, and a fresh one is inserted into the frame 6j, thus the filters are exchanged.

The deodorization filter unit 6 further comprises a cover 6m, a substantially rectangular plate, for enclosing the front opening of the frame 6j. The cover 6m includes a pair of protrusions 6r at the top edge of the rectangular plate and a pair of mounting tabs 6p at the bottom edge of the rectangular plate as shown in FIG. 6. A pair of slots 6q for receiving the mounting tabs 6p and a pair of resilient hooks 6s for engagement with the protrusions 6r are provided on the housing 6c of the deodorization filter unit 6 to mount and to secure the cover 6m on the housing 6c at the front opening. In order to change the used deodorization filter 6d, the front door 12 of the glove box is opened to remove the cover 6m from the housing 6c. Thus, the deodorization filter 6c can be exchanged in the direction shown by arrow Z in FIG. 4.

FIG. 6 illustrates the controller 15 for controlling the servo-motor 6g for rotating the switching door 6e. The controller 15 can be formed by a micro computer which includes a read only memory (ROM) 15a, a random access memory (RAM) 15b, central processing unit (CPU) 15c, an output port 15d, an input port 15e, which are connected by a bi-directional bus 15f. The servo-motor 6g is connected to the output port 15d through a motor driver 15h. A smell sensor 14 is connected to the input port 15e through an A/D converter 15i. Further, connected to the input port 15 through A/D converters 15j and 15k are a main switch 13a for the air conditioning system and a deodorization selecting switch 13b. The smell sensor 14, the main switch 13a, and the deodorization mode selecting switch 13b are connected to an electrical power source 16 to apply a voltage as signals to the controller 15 from the respective input elements.

The smell sensor 14 is a type of an oxidation semiconductor gas sensor which sends an electric voltage signal corresponding to concentration of the odorous substances, such as Nox and CH, which are contained in the exhaust gas from an automobile and are introduced into the passenger compartment, in the air flow within the first air duct 6a upstream of the switching door 6e.

Figure 8:
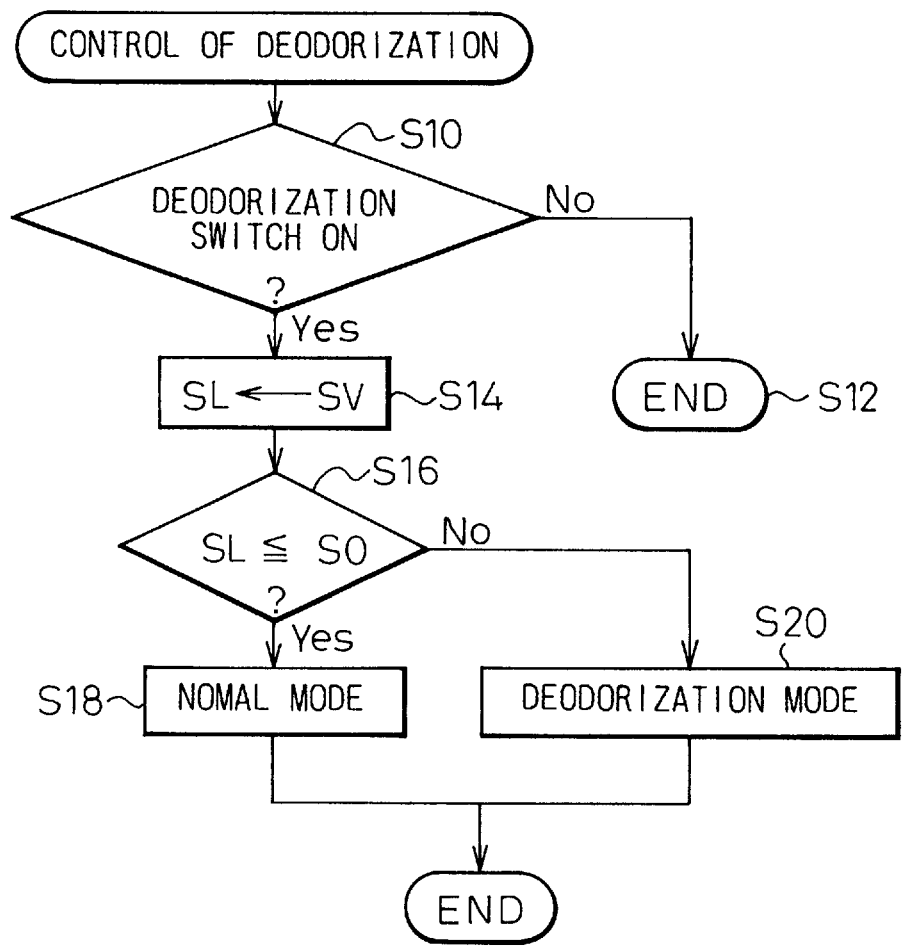
FIG. 8 is a flow chart for controlling the deodorization mode of air conditioning.

With reference to FIG. 8, the control of the servo-motor 6g will be described. FIG. 8 illustrates a routine for controlling the servo-motor 6g.

Once the main switch 13a is on, the routine for controlling the servo-motor 6g starts and goes to step S10, in which it is determined whether the deodorization mode selecting switch 13b is on or not. If the deodorization mode selecting switch 13b is not on, the routine is ended in step S12. If the deodorization mode selecting switch 13b is on, the routine goes to step S14, in which the signal Sv from the smell sensor 14 is input into S1.

In step S14, it is determined whether S1 is equal to or smaller than a predetermined value S0. If S1 is equal to or smaller than S0, it is determined that substantially no odorous substances exist in the air flow within the first air duct 6a, and the routine goes to step S18. In step S18, the normal mode of air conditioning is selected, and the servo-motor is energized to rotate the switching door 6e to the first position. Thus, air flow from the fan unit 1 is directed to the air conditioning unit 5 through the first air duct 6a and the switching door 6e.

In the normal mode of air conditioning, air from the fan unit 1 flows along the first air duct 6a which is defined by bottom wall, side walls of the housing 6c of the deodorization filter unit 6 and the bottom surface of the deodorization filter 6d. That is, the deodorization filter 6d does not extend into the first air duct 6a. Thus, the deodorization filter 6d does not obstruct the air flow to minimize the flow resistance of the air conditioning system. This increases the flow rate during the normal mode, and decreases the noise of the fan unit 1 and the power consumption of the drive motor 3b. Addition to this, the deodorization filter 6d, which defines the first air duct 6a, can provide a sound absorption effect which reduces the propagation of noise of air flow.

If S1 is greater than S0, it is determined that odorous substances exists in the air flow within the first air duct 6a, and the routine goes to step S20. In step S20, the deodorization mode of air conditioning is selected and the servo-motor is energized to rotate the switching door 6e to the second position. Thus, air flow from the fan unit 1 is directed to the air conditioning unit 5 through the deodorization filter 6d, the second air duct 6b and the passage 6h. When the air flow passes through the deodorization filter 6d, the odorous substances are remove from the air flow by the energized carbon in the deodorization filter 6d.

The above mentioned routine for controlling the servo-motor 6g is executed at a time interval preferably within the range of 0.5–1 sec.

Figure 9:
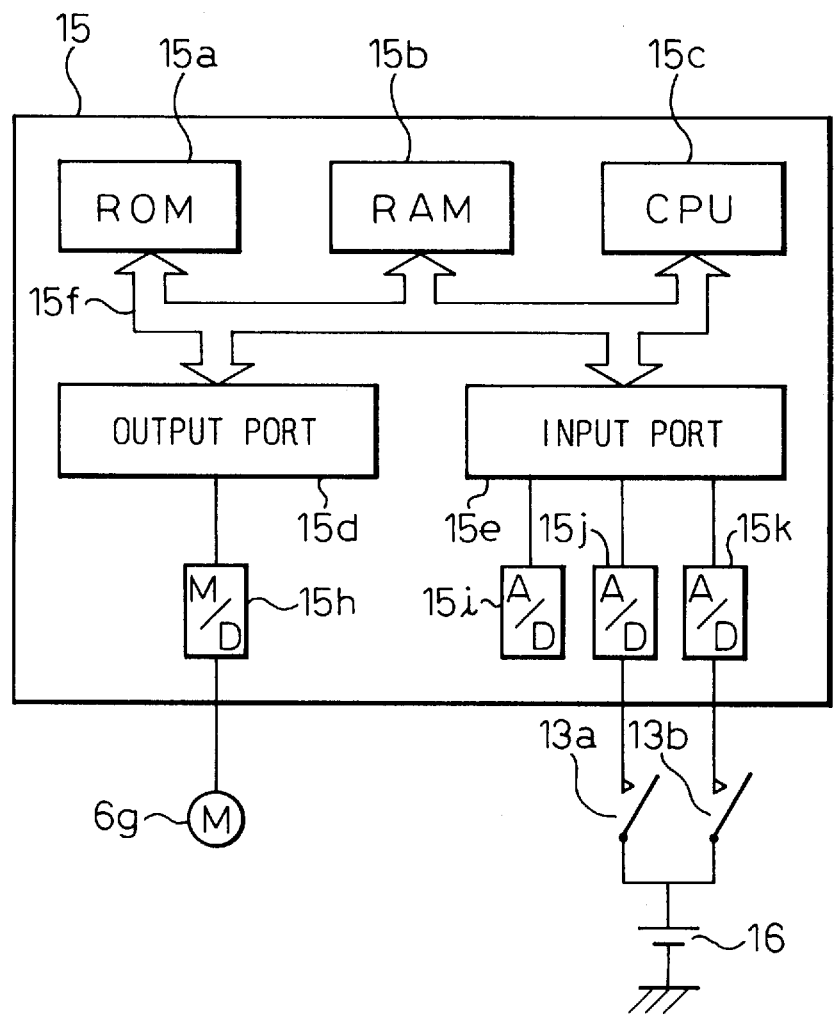
FIG. 9 is a schematic illustration of the controller of the air conditioning system according to another embodiment.
Figure 10:
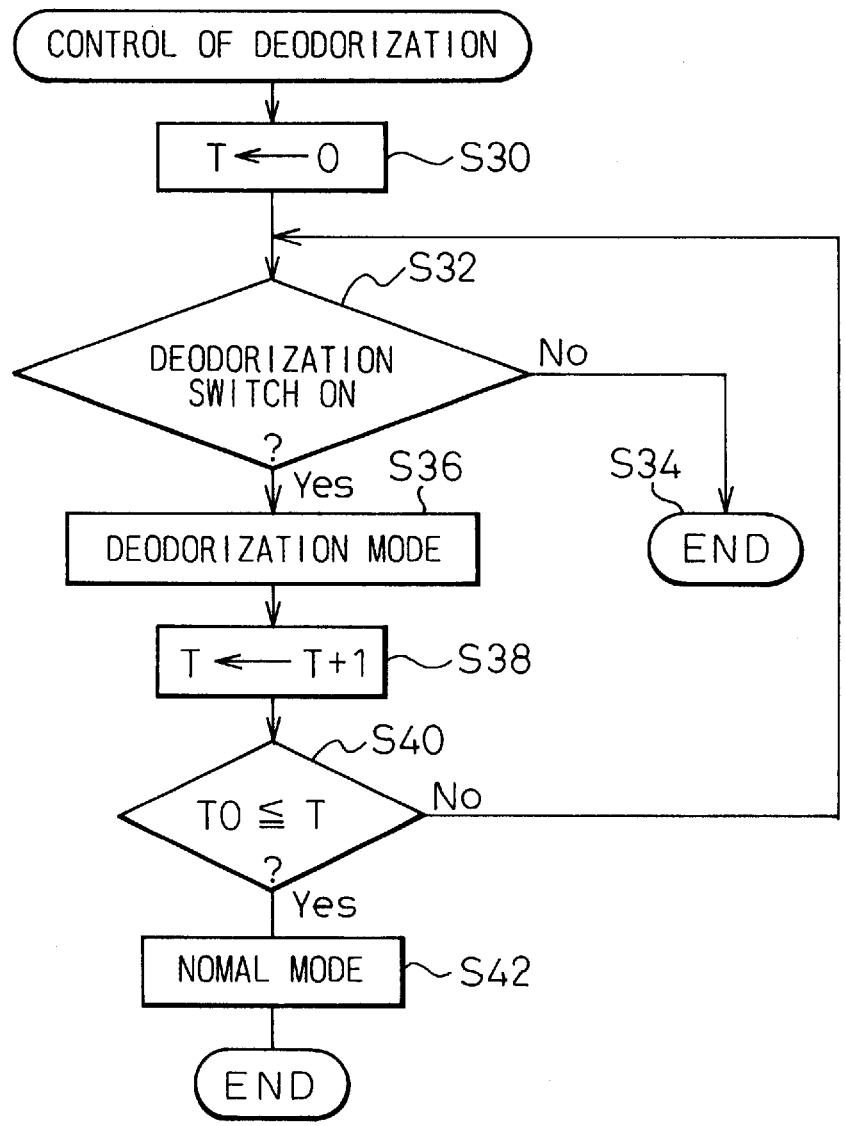
FIG. 10 is a flow chart for controlling the deodorization mode of air conditioning according to the embodiment of FIG. 9.

With reference to FIGS. 9 and 10, the second embodiment of the invention will be described.

The second embodiment is substantially the identical to the first embodiment, except that in the second embodiment, a timer means is provided instead of the smell sensor 14. Thus, the second embodiment does not comprise any sensors for detecting the concentration of the odorous substances as shown in FIG. 9. In FIGS. 9 and 10, the elements identical to those of the first embodiment are indicated by the same reference numbers.

With reference to FIG. 10, the control of the servo-motor 6g according to the second embodiment will be described. FIG. 10 illustrates a routine for controlling the servo-motor 6g.

Once the main switch 13a is on, the routine for controlling the servo-motor 6g starts and goes to step S30 in which zero is input into T. Then, the routine goes to step S32, in which it is determined whether the deodorization mode selecting switch 13b is on or not. If the deodorization mode selecting switch 13b is not on, the routine is ended in step S34. If the deodorization mode selecting switch 13b is on, the routine goes to step S36, in which the deodorization mode of air conditioning is selected, that is, and the servo-motor is energized to rotate the switching door 6e to the second position. Thus, air flow from the fan unit 1 is directed to the air conditioning unit 5 through the deodorization filter 6d and the second air duct 6b. When the air flow passes through the deodorization filter 6d, the malodorous substances are removed from the air flow by the energized carbon in the deodorization filter 6d.

Then, the routine goes to step S38 and T+1 is input into T. In step S40, it is determined that T is equal to or greater than a predetermined value T0. If T is smaller than T0, the routine goes back to step S32. Thus, the routine repeats steps S32–S40 until T satisfies the condition of T0≦T in step S40. While the routine repeats steps S32–S40, the mode of air conditioning is kept in the deodorization mode, that is, the servo-motor 6g is energized to rotate the switching door 6e at the second position. The predetermined value T0 is selected so that a sufficient time period to remove the odorous substances is obtained.

When T satisfies the condition of T0≦T in step S40, the routine goes to step S42, in which the normal mode of air conditioning is selected, and the servo-motor is energized to rotate the switching door 6e to the first position. Thus, air flow from the fan unit 1 is directed to the air conditioning unit 5 through the first air duct 6a and the switching door 6e.

The above mentioned routine for controlling the servo-motor 6g is executed at a time interval preferably within the range of 0.5–1 sec.

Figure 11:
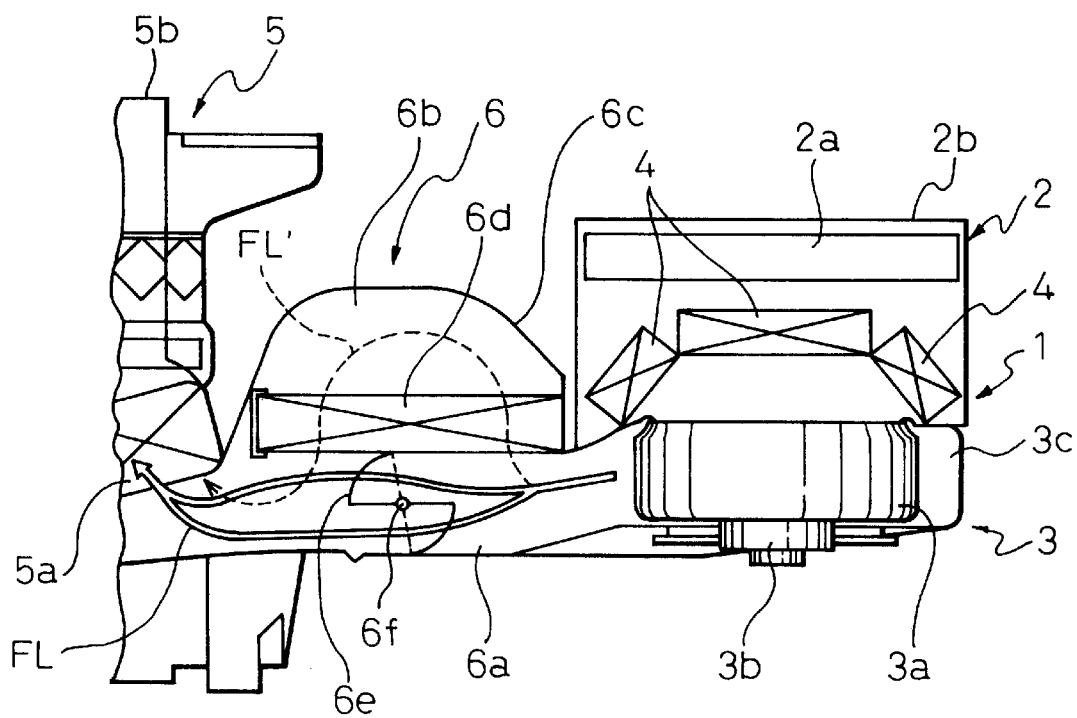
FIG. 11 is a sectional view similar to FIG. 1 according to another embodiment, in which a switching door during the deodorization mode is shown by a dashed line.

With reference to FIG. 11, the third embodiment of the invention will be described.

The third embodiment of the invention is substantially identical to the first and second embodiments, except for the dimension of the deodorization filter within the housing of, the deodorization filter unit and the position of the switching door within the first air duct. Thus, in FIG. 11, the elements identical to those in the first and second embodiments are indicated by the same reference numbers.

In this embodiment, the deodorization filter 6d extends to separate the second air duct 6b completely from the first air duct 6a while, in the first and second embodiments, the same extends between the inlet of the first air duct 6a and the switching door 6e to provide the passage 6h between the first and second air ducts downstream of the switching door 6e. Thus, in this embodiment, the passage 6h of the first and second embodiments is not provided. Further, the switching door 6e is provided within the first air duct 6a under the deodorization filter 6d substantially at the center of the filter along the flow direction in the first air duct 6a while the switching door is positioned at the downstream edge of the deodorization filter in the first and second embodiments.

The switching door 6e is rotatable between the first and second positions about the shaft 6f. When the switching door 6e is at the first rotational position as shown by the solid line in FIG. 11, the air flow from the fan unit 1 is directed to the air conditioning unit 5 through the first air duct 6a and the switching door 6e which is shown by flow line FL, as in the preceeding embodiments. On the other hand, when the switching door 6e is at the second position as shown by the dashed line in FIG. 11, air flow is obstructed by the switching door 6e at the second position and directed to the second air duct 6b. The air flow which enters the second air duct 6b is directed to the air conditioning unit 5 through the deodorization filter 6d again, as shown by the dashed curve FL'. Thus, according to the third embodiment, the air is filtered twice by the deodorization filter 6d when the deodorization mode is selected. This allows the deodorization filter 6d to be reduced in thickness.

Thus, according to the third embodiment, the overall dimensions of the deodorization filter unit 6 can be reduced.

With reference to FIGS. 12–19, the fourth embodiment of the invention will be described.

Figure 12:
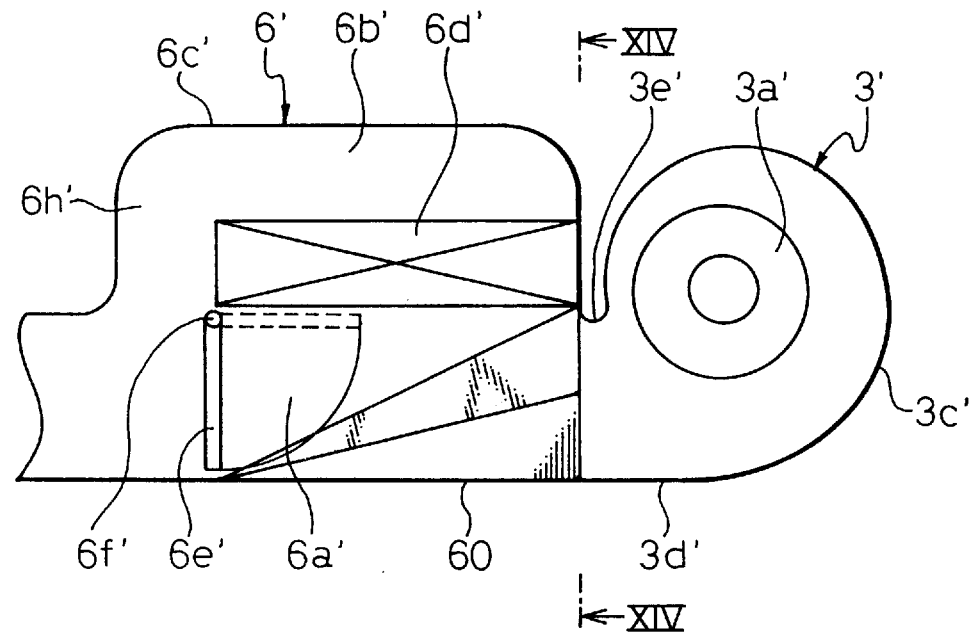
FIG. 12 is a partial sectional view of the air conditioning system according to another embodiment
Figure 13:
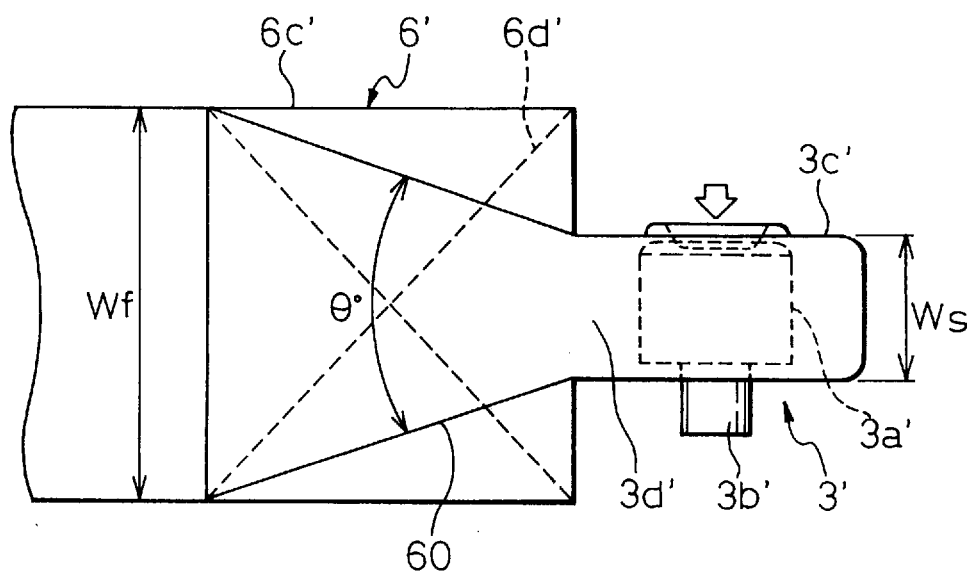
FIG. 13 is a bottom view of the air conditioning system of FIG. 12.
Figure 14:
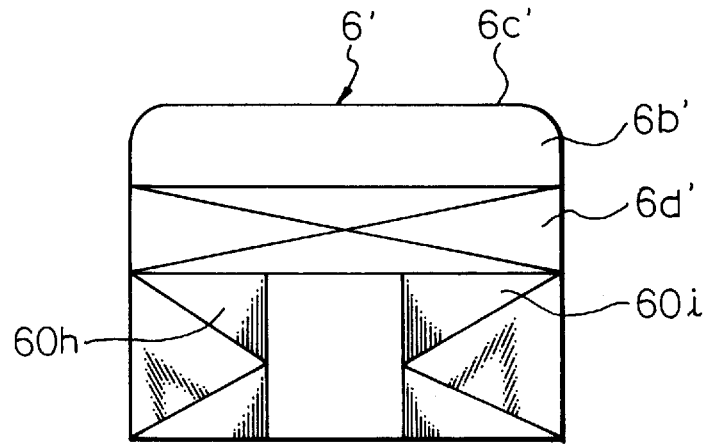
FIG. 14 is a side view of the air conditioning system along line XIV—XIV in FIG. 12.
Figure 15:
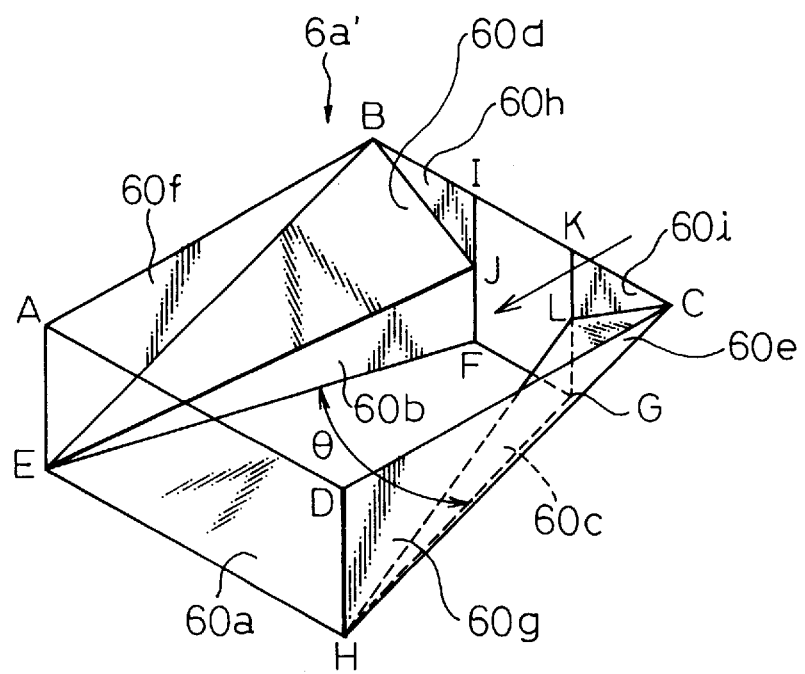
FIG. 15 is a perspective view of a first air duct according to the embodiment of FIG. 12.
Figure 16:
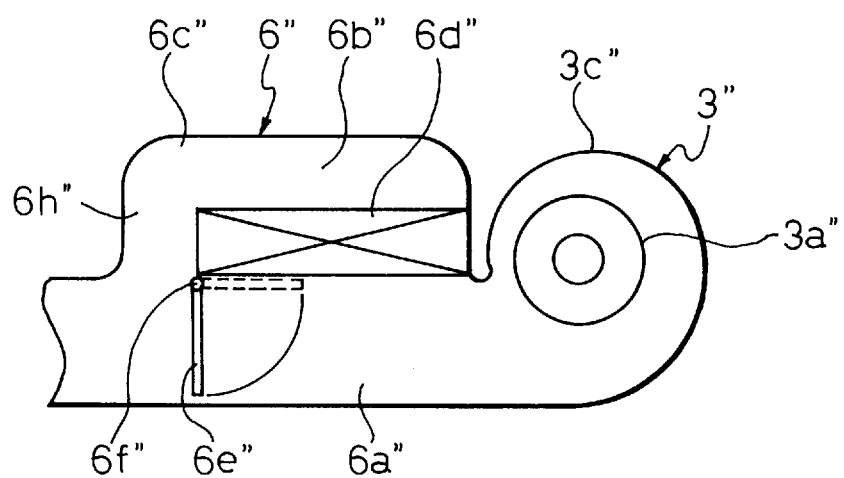
FIG. 16 is a partial sectional view of an air conditioning system similar to FIG. 12, in case that the invention is not applied.
Figure 17:
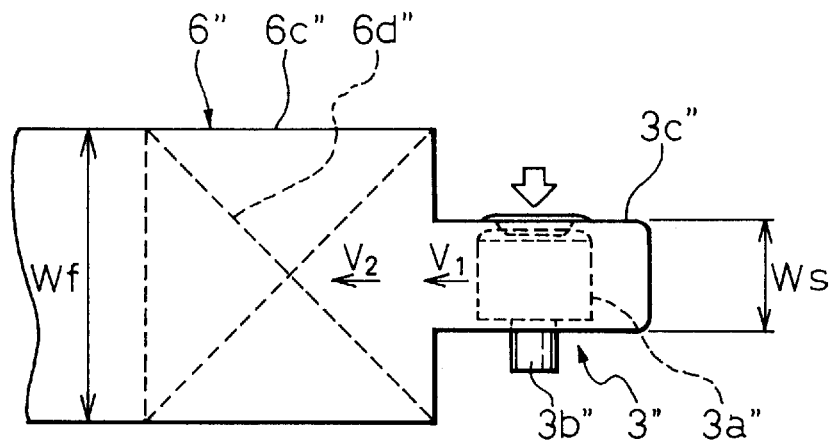
FIG. 17 is a bottom view of the air conditioning system of FIG. 13.
Figure 18:
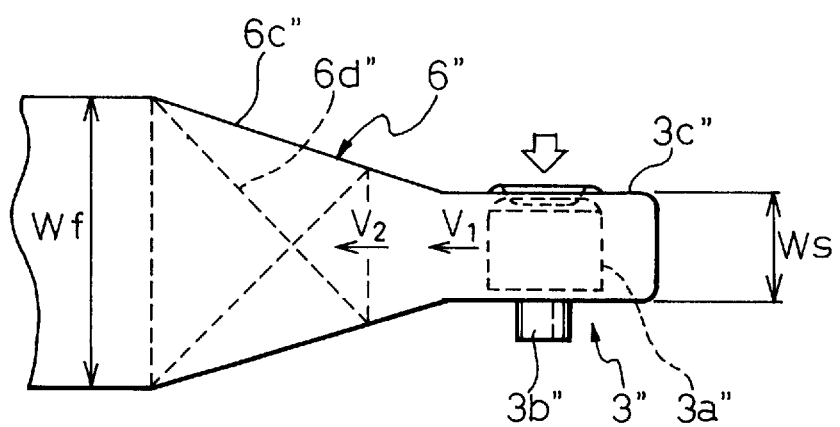
FIG. 18 is a bottom view of another example of the air conditioning system, in case that the invention is not applied.

In this embodiment, the fan is positioned so that its rotational axis is oriented to a horizontal direction as shown in FIGS. 12, 13 and 16 instead of, as in the preceeding embodiments, being positioned so that its rotational axis is oriented to the vertical direction. Further, in this embodiment, the configuration of the first air duct is different from that of the preceeding embodiments. In FIGS. 12, 13, 14, 15 and 16, the elements which correspond to those in the preceeding embodiments are indicated by the same reference numbers with primes. FIGS. 17 and 18 illustrate an example of the housing 6c of the deodorization filter unit 6, in which the first air duct does not include a duct configuration of according to the invention. In FIGS. 17 and 18, the elements which correspond to those in the embodiments of the invention are indicated by the same reference numbers with double primes.

In case that the dimension Ws of the exit of the connecting air duct 100, lateral to the flow direction within the first air duct 6a, is remarkably smaller than that Wf of the deodorization filter 6d, as shown in FIG. 17, air flow introduced into the first air duct 6a expands and the flow velocity decreases from $V_1$ to $V_2$ ($V_1 > V_2$) suddenly, which results in pressure loss Δ P of the air flow. The pressure loss Δ P of the air flow is defined as follows.

$$\Delta P = \zeta \frac{1}{2} \rho v_1$$

$$\zeta = \xi \left\{ 1 - \frac{v_1}{v_2} \right\}^2$$

Where,

ζ : flow resistance coefficient

ξ : coefficient

ρ : density of air (Kg/m3)

In the above equations, ξ is a coefficient shown in FIG. 19. ξ is 1.0 when the angle θ is greater that 60 degrees.

It will be understand that smaller the angled smaller the pressure loss Δ P is obtained. However, this is not practical way for solving the above problem since, if the angle θ is simply reduced as shown in FIG. 18, the area for mounting the deodorization filter 6d is reduced so that the performance of the filter is deteriorated.

In order to prevent the pressure loss of the air flow, the first air flow to diverge gradually in the flow direction, as shown in FIG. 8. However, as described above, the deodorization filter 6d defines the top inner surface of the first air duct 6a. Therefore, if the first air duct is formed into the shape in FIG. 18, the deodorization filter 6d must be reduced in volume.

Thus, in this embodiment of the invention, the filter unit 6 includes a first air duct 6a' improved to reduce the pressure loss while the area for the deodorization filter is maintained.

In particular, with reference to FIG. 15, the first air duct 6a' includes a bottom wall 60a which is substantially formed into a trapezoid E-F-G-H-E which has a top side F-G, a bottom side E-H which are parallel to each other, and two oblique sides F-E and G-H which are symmetrically apart to each other along the flow direction shown by an arrow in FIG. 15 so that an angle θ is provided therebetween. The deodorization filter 6d' is provided to cover the rectangular top opening A-B-C-D-A.

On the other hand, the switching door is provided so that the door closes a rectangular opening A-D-H-E-A when the deodorization mode is selected. In particular, in this embodiment, the rotational shaft 6f' is provided along one edge of the switching door 6e as shown in FIG. 12. The switching door 6e' is provided so that the rotational shaft 6f' extends substantially along the top side A-D of the rectangular opening A-D-H-E-A.

Between the bottom wall 60a and the top opening, a pair of side walls are provided. The side walls include three triangular walls 60b, 60d and 60f; 60c, 60e and 60g respectively. The first triangular wall 60b and 60c are connected to the bottom wall 60a perpendicular to each other along the oblique sides F-E and G-h of the bottom wall 60a. The third triangular walls 60f and 60g are parallel to each other to define the rectangular to opening A-B-C-D-A where the deodorization filter is positioned.

The second triangular walls 60d and 60e are connected to the first and third triangular walls 60b and 60f; 60c and 60g. A pair of front triangular walls 60h and 60i are connected to the second triangular walls 60d and 60e perpendicular to the bottom wall 60a along the oblique sides B-J and C-L of the second triangular walls 6d and 60e. In particular, the front triangular walls 60h and 60i are connected to the second triangular walls 60e and 60e so that the sides J-F and L-G of the first triangular walls 60b and 60c are aligned to the sides I-J and K-L of the front triangular walls 60h and 60i, and a rectangular opening I-K-G-F-I is formed between the front triangular walls and the first triangular walls.

The rectangular opening I-K-G-F-I provides the inlet port of the first air duct 6a', that is, the connection air duct (not shown in FIG. 15), which is provided between the fan unit and the deodorization filter unit, is connected to the rectangular opening I-K-G-F-I. In particular, in this embodiment, the fan unit 3' is connected to the first air duct 6a' so that the end of the outer wall, which extens spirally, of the scroll casing 3a is connected to the top side F-G of the trapezoidal bottom wall 60a.

Air flow is introduced into the first air duct 6a' through the inlet opening I-K-G-F-I, directed to the deodorization filter through the top opening A-B-C-D-A when the deodorization mode is selected, and directed to the air conditioning unit through the opening A-D-H-E-A when the normal mode is selected.

According to this embodiment, while the area for the deodorization filter 6d' is not reduced because of the rectangular to opening A-B-C-D-A, the pressure loss Δ P can be reduced by making the angle θ smaller than 60 degrees, at which the flow resistance coefficient ζ is equal to or smaller than 0.9 as shown in FIG. 19.

According to the invention, the deodorization filter 6d and 6d' is positioned at a horizontal position relative to the evaporator 5a, as shown in FIGS. 1, 3 and 10, that is, the deodorization filter 6d is not positioned at substantially a vertical position lower that that of the evaporator 5a. This prevents the deodorization filter 6d from receiving condensation from the evaporator 5a. Therefore, no odor, due to water applied to the deodorization filter, will be generated.

In the preceeding embodiment, the switching door 6e and 6e' is actuated by the servo-motor 6g. However, the switching door can be moved between the first and second operational positions, by hand, by a driver or a passenger. In this case, a lever or a handle for operating the switching door can be provided on the front face (not shown) of the car dashboard 8. The lever may be connected to the shaft 6f and 6f' through a link or a cable.

In the preceeding embodiment, the air conditioning system includes both a deodorization filter and a dust filter. However, the invention can be applied to an air conditioning system which includes only a dust filter which is provided between the first and second air duct, where the deodorization filter is positioned in the embodiment.

It may be further understood by those skilled in the art that the forgoing description is a preferred embodiment of the disclosed device and that various changes and modifications may be made without departing from the spirit and scope of the invention.

We claim:

1. An automobile air conditioning system comprising:
    a fan unit for generating an air flow;
    a first air duct, provided downstream of the fan unit, for directing the air flow to the passenger compartment of the automobile;
    a second air duct, branched from the first air duct to extend substantially parallel to the first air duct, for directing the air flow to the passenger compartment of the automobile; and
    a filter means, provided between the first and second air ducts, for cleaning the air flow to the second air duct from the first air duct through the filter means, the filter means extending parallel to the first air duct to separate the second air duct from the first air duct.

2. An automobile air conditioning system according to claim 1 in which the filter means defines a portion of the wall of the first air duct.

3. An automobile air condition system comprising:
    a fan unit for generating an air flow;
    a first air duct, provided downstream of the fan unit, for directing the air flow to the passenger compartment of the automobile;
    a second air duct, branched from the first air duct to extend substantially parallel to the first air duct, for directing the air flow to the passenger compartment of the automobile;
    a filter means, provided between the first and second air ducts, for cleaning the air flow to the second air duct from the first air duct through the filter means, the filter means extending parallel to the first air duct to separate the second air duct from the first air duct; and
    means for selectively directing the air flow from the fan unit to the passenger compartment through the first air duct or through the first and second air ducts.

4. An automobile air conditioning system according to claim 3 further comprising a heat exchanger for exchanging heat between a heat transporting medium within the heat exchanger and the air flow outside of the heat exchanger.

5. An automobile air conditioning system according to claim 4, in which the fan unit is disposed under a car dashboard;

the heat exchanger is disposed at one side of the fan unit in the transverse direction of the automobile under the car dashboard.

6. An automobile air conditioning system according to claim 4, in which the second air duct is disposed over the first air duct.

7. An automobile air conditioning system according to claim 6, in which the filter means extends substantially in a horizontal plane between the first and second air duct to allow the air flow to be directed upwardly from the first air duct to the second air duct.

8. An automobile air conditioning system according to claim 4, in which the air flow directing means is provided under the filter means at the downstream end of thereof along the air flow within the first air duct.

9. An automobile air conditioning system according to claim 4, in which the filter means comprises a deodorization filter for removing odorous substances from the air flow through the filter.

10. An automobile air conditioning system according to claim 4, in which the filter means is removably provided under the car dashboard and can be removed by opening a glove box provided on the car dashboard.

11. An automobile air conditioning system according to claim 4, in which the air flow directing means is provided under the filter means substantially at the center of the filter along the flow direction within the first air duct.

12. An automobile air conditioning system according to claim 4 further comprising a dust filter, upstream of the first air duct, for removing solid particles within the air flow directed to the first air duct.

13. An automobile air conditioning system according to claim 8 in which the flow directing means comprises a plate member which is provided within the first air duct for rotation between a first position at which the plate member blocks the first air duct, and a second position at which the plate member allows the air flow within the first air duct to pass through the plate member;

actuating means for rotating the plate member; and means for controlling the actuating means.

14. An automobile air conditioning system according to claim 13 further comprising a deodorization switch which is adapted to be manually operated;

a smell sensor for detecting a concentration of the odorous substances in the air flow upstream of the second air flow, the smell sensor sending a signal to the controlling means representing the concentration of the odorous substances; and the controlling means sending a signal to the actuating means to rotate the plate member to the first position when the deodorization switch is on, and the signal sent to the controlling means is equal to or higher than a predetermined value.

15. An automobile air conditioning system according to claim 13 further comprises a deodorization switch which is adapted to be manually operated;

a timer means which starts its operation when the deodorization switch is on; and the controlling means sending a signal to the actuating means to rotate the plate member to the first position until a predetermined time period passes.

16. An automobile air conditioning system according to claim 3 in which the fan unit comprises a centrifugal fan, and a scroll casing which contained the centrifugal fan;

the first air duct including a bottom wall facing the filter means over the bottom wall, which is formed substantially into a trapezoidal shape, and a pair of side walls connected to the bottom wall along the oblique sides of the bottom wall, the oblique sides of the bottom wall symmetrically diverged in the downstream direction within the first air duct; and the scroll casing including an outer wall which extends spirally, the end of the outer wall being connected to the bottom wall at the top side of the trapezoid.

17. An automobile air conditioning system according to claim 3 in which the filter means defines a portion of the wall of the first air duct.

* * * * *